(12) United States Patent
Kim et al.

(10) Patent No.: US 11,487,448 B2
(45) Date of Patent: Nov. 1, 2022

(54) STORAGE DEVICE USING UNSUPERVISED LEARNING SCHEME AND MEMORY MANAGEMENT METHOD THEREOF

(71) Applicant: SAMSUNG ELECTRONICS CO., LTD., Suwon-si (KR)

(72) Inventors: Byeonghui Kim, Hwaseong-si (KR); Jungmin Seo, Seongnam-si (KR); Kangho Roh, Seoul (KR); Hyeongyu Min, Seoul (KR); Jooyoung Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/038,371

(22) Filed: Sep. 30, 2020

(65) Prior Publication Data
US 2021/0200454 A1  Jul. 1, 2021

(30) Foreign Application Priority Data
Dec. 26, 2019  (KR) .................. 10-2019-0175237

(51) Int. Cl.
*G06F 3/06* (2006.01)
*G06N 20/00* (2019.01)

(52) U.S. Cl.
CPC ............ *G06F 3/0631* (2013.01); *G06F 3/064* (2013.01); *G06F 3/0611* (2013.01); *G06F 3/0659* (2013.01); *G06F 3/0679* (2013.01); *G06N 20/00* (2019.01)

(58) Field of Classification Search
CPC ...... G06F 3/0631; G06F 3/0611; G06F 3/064; G06F 3/0679; G06F 3/061; G06F 12/0246; G06F 3/0649; G06N 20/00; G06N 3/088; G06K 9/6267
See application file for complete search history.

(56) References Cited

U.S. PATENT DOCUMENTS

| | | |
|---|---|---|
| 8,438,195 B2 | 5/2013 | Kim et al. |
| 8,700,841 B2 | 4/2014 | Doatmas et al. |
| 9,176,863 B2 | 11/2015 | Seo et al. |
| 9,176,864 B2 | 11/2015 | Gorobets et al. |
| 9,996,292 B2 | 6/2018 | Kim et al. |

(Continued)

FOREIGN PATENT DOCUMENTS

WO  WO-2018165502 A1 * 9/2018 ........... G06F 3/0631

OTHER PUBLICATIONS

Kyan, M, and Muneesawang, N, and Jarrah, K, and Guan L. Unsupervised Learning: A Dynamic Approach. IEEE Press Series on Computational Intelligence [online], 2014 [retrieved on Oct. 25, 2021]. Retrieved from the Internet:< URL: https://ieeexplore.ieee.org/book/6836130 >. Online ISBN: 9781118875568 (Year: 2014).*

(Continued)

*Primary Examiner* — David Yi
*Assistant Examiner* — Dustin B. Fulford
(74) *Attorney, Agent, or Firm* — Sughrue Mion, PLLC

(57) ABSTRACT

A method includes sampling input/output requests from a host to generate sampled input/output requests; classifying the sampled input/output requests into clusters using an unsupervised learning algorithm; determining a hot data range based on a characteristic of the clusters; and incorporating the determined hot data range into a hot data table.

17 Claims, 12 Drawing Sheets

(56) References Cited

U.S. PATENT DOCUMENTS

| | | | |
|---|---|---|---|
| 10,095,418 B1* | 10/2018 | Gong | G06F 3/0689 |
| 10,216,422 B2 | 2/2019 | Kim et al. | |
| 2018/0373722 A1 | 12/2018 | Ulasen et al. | |
| 2019/0278480 A1 | 9/2019 | Lam et al. | |

OTHER PUBLICATIONS

Dongsoo Choi et al., "Semantic-Aware Hot Data Selection Policy for Flash File System in Android-based Smartphones", 2013 IEEE International Conference on Parallel and Distributed Systems, DOI 10.1109/.76, 2013, pp. 444-445, 2 pages total.

Dong Hyun Kang et al., "Dynamic Hot-Cold Separation Scheme on the Log-structured File System for CE Devices", 2017 IEEE International Conference on Consumer Electronics (ICCE), 2017, 2 pages total.

Dongchul Park et al., "Hot Data Identification for Flash-based Storage Systems Using Multiple Bloom Filters", IEEE, 2011, 11 pages total.

Sanghyuk Jung et al., "A Process-Aware Hot/Cold Identification Scheme for Flash Memory Storage Systems", IEEE Transactions on Consumer Electronics, vol. 56, No. 2, May 2010, pp. 339-347, 9 pages total.

Mei-Ling Chiang et al., "Using Data Clustering to Improve Cleaning Performance for Flash Memory", Software—Practice and Experience, 29, 3, 1999, pp. 267-290, 24 pages total.

\* cited by examiner

FIG. 8

| Cluster | LBA range | | LBA continuity count | LBA overwrite count/ratio | Average I/O Interval (ms) | Total I/O count | Total Written size(Byte) | Req. size Average (Byte) | Req. size Standard Deviation |
|---|---|---|---|---|---|---|---|---|---|
| | LBA_min | LBA_max | | | | | | | |
| 1 | 0 | 149 | 50 | 0/0 | 500 | 5 | 550M | 250M | 120 |
| 2 | 150 | 299 | 1 | 40/0.8 | 3 | 180 | 6M | 22K | 3 |
| 3 | 300 | 499 | 60 | 0/0 | 600 | 12 | 250M | 300M | 250 |
| 4 | 500 | 799 | 0 | 65/0.7 | 5 | 245 | 5M | 5K | 5 |
| ... | ... | ... | ... | ... | ... | ... | ... | ... | ... |
| n | 1500 | 1800 | 55 | 0/0 | 550 | 15 | 2G | 440Byte | 150 |

FIG. 10

HDT

| Cluster | LBA range | | Hot / Cold | Hot Intensity |
|---|---|---|---|---|
| | LBA_min | LBA_max | | |
| 1 | 0 | 150 | Cold | - |
| 2 | 150 | 299 | Hot | 2 |
| 3 | 300 | 499 | Cold | - |
| 4 | 500 | 799 | Hot | 1 |
| ⋮ | ⋮ | ⋮ | ⋮ | ⋮ |
| n | 1500 | 1800 | Cold | - |

STORAGE DEVICE USING UNSUPERVISED LEARNING SCHEME AND MEMORY MANAGEMENT METHOD THEREOF

CROSS-REFERENCE TO RELATED APPLICATION

This application claims priority under 35 U.S.C. § 119 to Korean Patent Application No. 10-2019-0175237 filed on Dec. 26, 2019, in the Korean Intellectual Property Office, the disclosure of which is incorporated by reference herein in its entirety.

BACKGROUND

1. Field

Devices, apparatuses, systems and methods consistent with the present disclosure relate to a semiconductor memory device, and more particularly, relate to a storage device using an unsupervised learning scheme and a memory management method thereof.

2. Description of Related Art

A flash memory device is being widely used as a voice and image data storage medium of information devices such as a computer, a smartphone, a personal digital assistant (PDA), a digital camera, a camcorder, a voice recorder, an MP3 player, and a handheld PC. There is increasing generalization of the flash memory device as a storage device. Nowadays, a semiconductor memory device with a three-dimensional array structure is being supplied to improve the degree of integration of the flash memory device. Cell strings of the flash memory device having the three-dimensional array structure are stacked along a direction perpendicular to a substrate. That is, memory cells are provided on the substrate along rows and columns and are stacked in the direction perpendicular to the substrate to form the three-dimensional structure.

A storage device using the flash memory device identifies and manages hot data/cold data for the purpose of making efficiency of garbage collection high. The hot data means data having a relatively high update frequency, and the cold data means data having a relatively low update frequency. As data are managed in a state of being classified into the hot data and the cold data, the number of times of a page copy necessary for the garbage collection may decrease.

However, a scheme to store a logical block address (LBA) by using a limited memory is still used as a scheme to classify data into the hot data and the cold data. In this case, a memory window for storing an input LBA is limited, and thus, there is a limitation on accuracy. As a size of the memory window increases, accuracy may be increased but at the expense of increased overhead. It would be advantageous to have a technology for identifying hot data more efficiently for the purpose of efficiently managing a high-speed, high-capacity storage device and increasing a lifetime thereof.

SUMMARY

It is an aspect to provide a storage device capable of identifying hot data with high accuracy without increasing overhead and an operating method thereof.

According to an aspect of an exemplary embodiment, there is provided a method comprising sampling, by a processor, a plurality of input/output requests from a host to generate sampled input/output requests; classifying, by the processor, the sampled input/output requests into a plurality of clusters using an unsupervised learning algorithm; determining, by the processor, a hot data range based on a characteristic of the plurality of clusters; and incorporating, by the processor, the determined hot data range into a hot data table.

According to another aspect of an exemplary embodiment, there is provided a storage device comprising a storage controller configured to sample, during a first period, a plurality of input/output requests transmitted from a host to generate sampled data, to classify the sampled data into a plurality of clusters using an unsupervised learning algorithm, to determine a hot data range based on a characteristic of the plurality of clusters, and to incorporate the determined hot data range into a hot data table; and a nonvolatile memory device configured to provide a memory block for storing write-requested data under control of the storage controller, wherein the storage controller determines whether input/output requests transmitted from the host during a second period correspond to hot data, with reference to the hot data table.

According to yet another aspect of an exemplary embodiment, there is provided a memory system comprising a storage device configured to receive multi-stream data and to allocate a memory block on a stream basis; and a host configured to sample a plurality of input/output requests from at least one application program during a first period to generate sampled data, to classify the sampled data into a plurality of clusters using an unsupervised learning algorithm, to determine a hot data range based on a characteristic of the plurality of clusters, to incorporate the determined hot data range into a hot data table, and to allocate, based on the hot data table, a stream identifier to be transmitted to the storage device during a second period.

BRIEF DESCRIPTION OF THE FIGURES

The above and other aspects will become apparent by describing in detail exemplary embodiments thereof with reference to the accompanying drawings, in which:

FIG. 8 is a table illustrating a method of analyzing sampled and clustered input/output requests, according to an embodiment;

FIG. 10 is a diagram illustrating a hot data table according to an embodiment;

DETAILED DESCRIPTION

Figure 1:
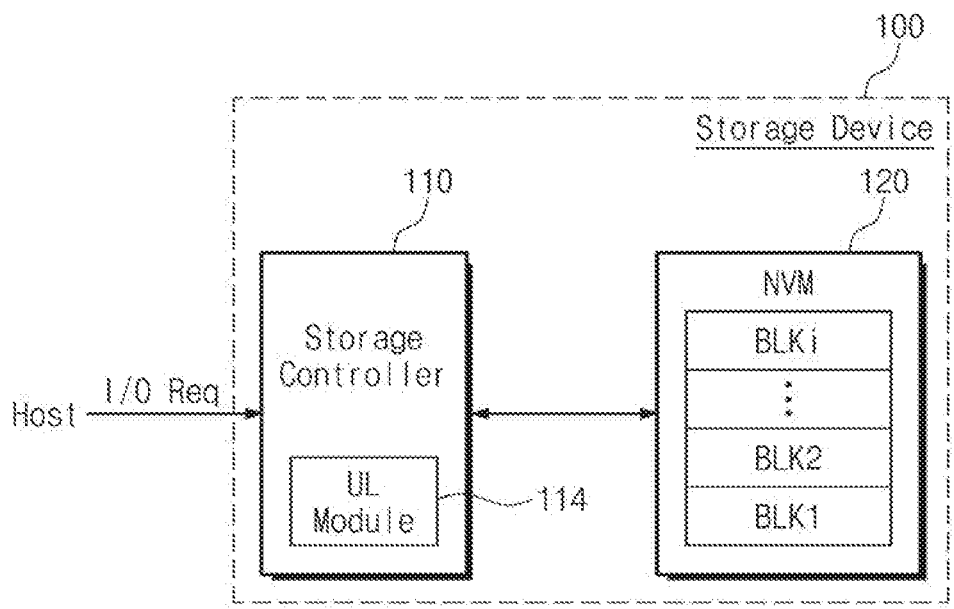
FIG. 1 is a block diagram illustrating a storage device according to an embodiment.

It should be understood that both the foregoing general description and the following detailed description are provided as examples, and it should be regarded as an additional description is provided. Reference numerals will be represented in detail in various embodiments discussed below, examples of which are illustrated in the accompanying drawings. Wherever possible, the same reference numerals are used in the drawings and the description to refer to the same or similar parts.

Below, a storage device using a flash memory device will be exemplified to describe features and functions of the various exemplary embodiments. However, one skilled in the art may easily understand other merits and performance of the exemplary embodiments from the content disclosed here. The exemplary embodiments illustrates may be implemented or applied through other embodiments. In addition, the detailed description may be changed or modified depending on view points and applications without departing from scope and spirit of the disclosure as set forth in the attached the claims.

FIG. 1 is a block diagram illustrating a storage device according to an embodiment. Referring to FIG. 1, a storage device 100 may include a storage controller 110 and a nonvolatile memory device 120. In some embodiments, each of the storage controller 110 and the nonvolatile memory device 120 may be implemented with one chip, one package, or one module. Alternatively, in other embodiments, the storage controller 110 and the nonvolatile memory device 120 may be implemented with one chip, one package, or one module to constitute a memory system such as a memory card, a memory stick, or a solid state drive (SSD).

The storage controller 110 may be configured to control the nonvolatile memory device 120. For example, in response to an input/output request (I/O Req) of a host, the storage controller 110 may write data to the nonvolatile memory device 120 or may read data stored in the nonvolatile memory device 120. To access the nonvolatile memory device 120, the storage controller 110 may provide a command, an address, data, and a control signal to the nonvolatile memory device 120.

In particular, the storage controller 110 may include an unsupervised learning (UL) module 114 according to an embodiment. The storage controller 110 may sample an input/output (I/O) request provided from the host. A time when the sampling is performed is called a "sampling period". The sampling period is allocated at a given cycle during a runtime of the storage device 100. A time between sampling periods is called as a "sampling cycle". During the sampling period, the storage controller 110 may randomly sample input/output requests provided from the host. The sampling of input/output requests means selecting a portion of input/output requests and storing characteristic information, such as a logical block address (LBA) and a data size, of the selected portion of input/output requests to a reserved memory.

The unsupervised learning module 114 may identify hot data or cold data by using the sampling result. The unsupervised learning module 114 may classify sampled LBAs and may classify data of the sampled LBAs into the hot data and the cold data. The unsupervised learning module 114 clusters the sampled LBAs through unsupervised learning. The unsupervised learning module 114 may analyze a clustered result to generate a hot data table HDT. The hot data table HDT may include the following statistical information about hot data: an LBA range, an overwrite ratio (i.e., a ratio of the number of overwrites to the number of writes), an input/output count, an input/output interval, and/or an input/output request, etc. In some embodiments, an overwrite count may be used in additional to or in place of the overwrite ratio.

The storage controller 110 may determine whether a received input/output request is associated with an LBA corresponding to hot data, with reference to the hot data table HDT. The hot data table HDT is used to manage address area-based information about an LBA range, and not to manage information about LBAs of a specific range. That is, according to the hot data table HDT, hot data information about all LBAs that the storage device 100 supports may be provided. The hot data table HDT may provide information capable of determining whether a received input/output request is included in an LBA range of hot data (or referred to as a "hot data LBA range" or a "hot data range"). Accordingly, in the case of using the hot data table HDT, it is possible to identify at high speed hot data with respect to all LBAs received.

Under control of the storage controller 110, the nonvolatile memory device 120 may store data received from the storage controller 110 or may transmit data stored therein to the storage controller 110. The nonvolatile memory device 120 may include a plurality of memory blocks BLK1 to BLKi. Each of the plurality of memory blocks BLK1 to BLKi may have a three-dimensional memory structure in which word line layers are stacked in a direction perpendicular to a substrate.

According to an embodiment, the storage device 100 may sample received input/output requests in real time and may cluster the sampling result through the unsupervised learning algorithm. The storage device 100 may analyze an LBA characteristic (e.g., continuous or random) for each of the clusters and may generate the hot data table HDT that is based on an address area. According to the storage device 100, whether a received input/output request is associated with hot data may be determined with respect to all input/output requests by using (i.e., with reference to) the hot data table HDT, regardless of a range of an input LBA.

Figure 2:
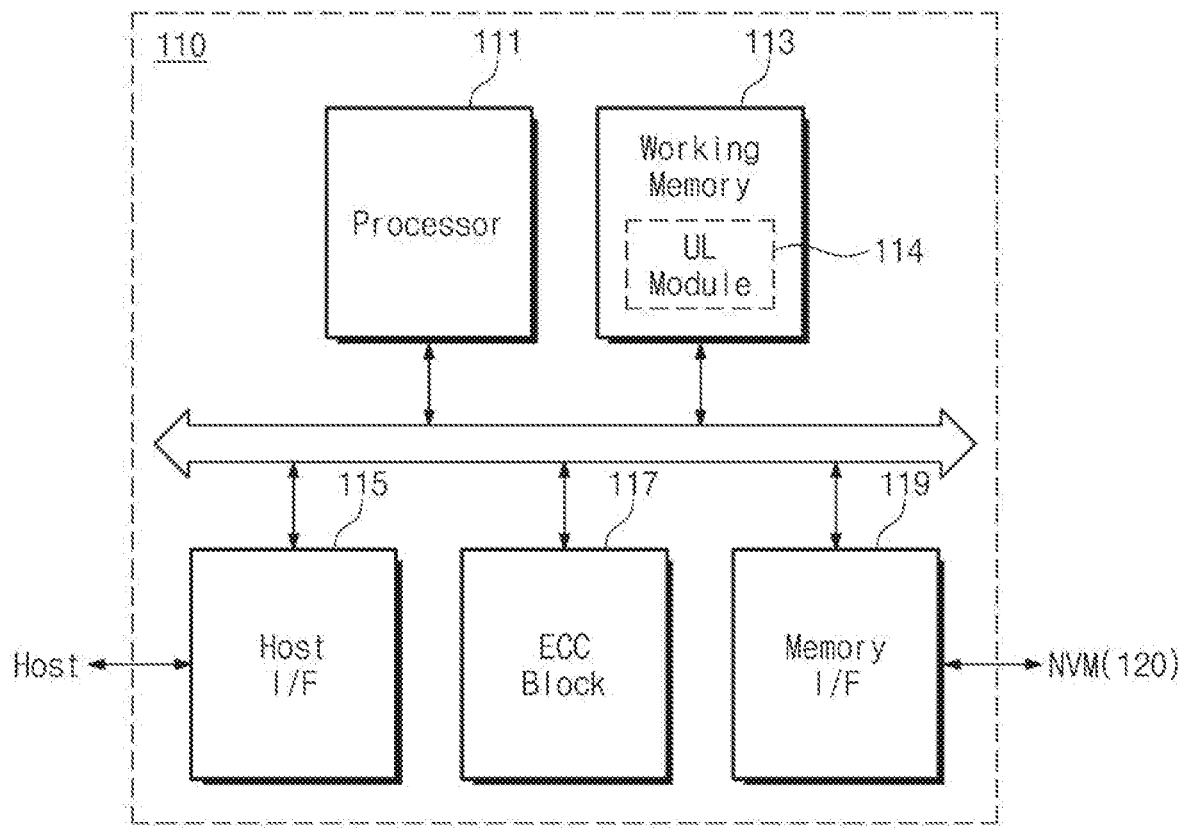
FIG. 2 is a block diagram illustrating a configuration of a storage controller of the storage device of FIG. 1, according to an embodiment.

FIG. 2 is a block diagram illustrating a configuration of a storage controller of the storage device 100 of FIG. 1, according to an embodiment. Referring to FIG. 2, the storage controller 110 includes a processor 111, a working memory 113, a host interface (I/F) 115, an error correction code (ECC) block 117, and a memory interface (I/F) 119. However, it may be well understood that components of the storage controller 110 are not limited to the components illustrated in the example of FIG. 2. For example, the storage controller 110 may further include a read only memory (ROM) that stores code data for an initial booting operation, and/or other components.

The processor 111 may include a central processing unit (CPU) or a micro-processor. The processor 111 may manage overall operations of the storage controller 110. The processor 111 is configured to execute firmware for driving the storage controller 110.

Software (or firmware) for controlling the storage controller 110 or data may be loaded onto the working memory 113. The stored software and data may be executed or processed by the processor 111. In particular, according to some embodiments, at least one firmware that performs a memory management operation may be loaded onto the working memory 113. For example, firmware or software such as a flash translation layer FTL may be loaded onto the working memory 113 and may be called or executed by the processor 111. In general, the flash translation layer FTL that is executed by the processor 111 performs functions such as an address mapping function, a garbage collection function, and/or a wear-leveling function, etc.

In addition, the unsupervised learning module 114 may be loaded onto the working memory 113. When the unsupervised learning module 114 is executed by the processor 111, an input/output request transmitted to the storage controller 110 may be sampled. The unsupervised learning module 114 classifies I/O-requested data into hot data and cold data by using the sampling result and forms the hot data table HDT. To identify hot data/cold data from the sampling result, the unsupervised learning module 114 may use a heuristic algorithm or an unsupervised learning algorithm. An algorithm such as a K-means algorithm, a density-based spatial clustering of applications with noise (DBSCAN) algorithm, a Gaussian Mixture algorithm, or a Balanced Iterative Reducing and Clustering using Hierarchies (BIRCH) algorithm may be used as the unsupervised learning algorithm. The unsupervised learning module 114 may analyze a result of the clustering and may generate the hot data table HDT. The hot data table HDT may include the following statistical information about hot data: an LBA range, an overwrite ratio, an input/output count, an input/output interval, and/or an input/output request, etc. The hot data table HDT is used to manage address area-based information about an LBA range, not to manage information about LBAs of a specific range. The storage controller 110 may determine whether a received input/output request is associated with an LBA corresponding to hot data, with reference to the hot data table HDT. Accordingly, in the case of using the hot data table HDT, it is possible to identify at high speed hot data with respect to all LBAs received.

The host interface (I/F) 115 provides an interface between the host and the storage controller 110. The host and the storage controller 110 may be connected through one of various standardized interfaces. Here, the standardized interfaces include various interfaces such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI Express (PCI-E) interface, a universal serial bus (USB) interface, an IEEE 1394 interface, a universal flash store (UFS) interface, or a card interface, etc.

The ECC block 117 may correct an error of data damaged due to various causes. For example, the ECC block 117 may perform a calculation to detect or correct an error of data read from the nonvolatile memory device 120. In particular, the ECC block 117 may detect the number of error bits of data read from memory cells in units of a word line or a bit error rate BER of the read data, depending on a request of the unsupervised learning module 114.

The memory interface (I/F) 119 may provide an interface between the storage controller 110 and the nonvolatile memory device 120. For example, data processed by the processor 111 may be stored to the nonvolatile memory device 120 through the memory interface (I/F) 119. For another example, data stored in the nonvolatile memory device 120 are provided to the processor 111 through the memory interface (I/F) 119.

The components of the storage controller 110 are described above. According to the functions of the storage controller 110, the storage controller 110 samples input/output requests provided from the host and generates the hot data table HDT that is based on an address area. The storage controller 110 may determine whether an input/output request received after the generation of the hot data table HDT is associated with hot data, with reference to the hot data table HDT. Accordingly, the storage controller 110 may determine at high speed whether a received input/output request is associated with hot data without a limitation on an LBA range.

Figure 3:
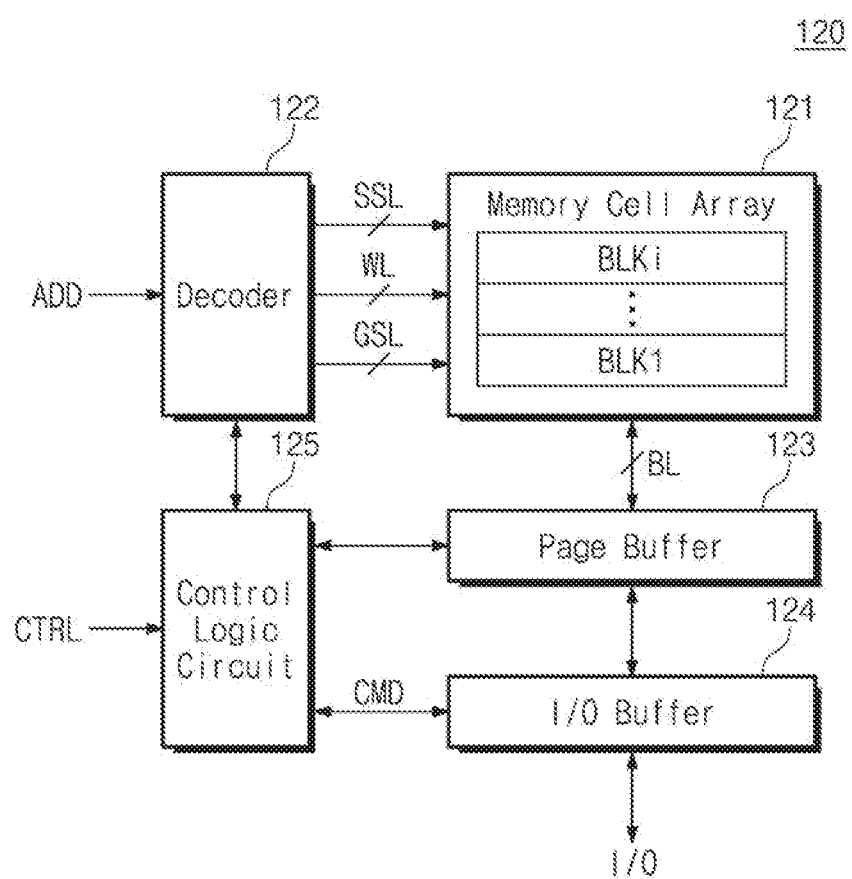
FIG. 3 is a block diagram illustrating a nonvolatile memory device according to an embodiment.

FIG. 3 is a block diagram illustrating a nonvolatile memory device according to an embodiment. Referring to FIG. 3, the nonvolatile memory device 120 may include a memory cell array 121, a decoder 122, a page buffer 123, an input/output (I/O) buffer 124, and a control logic circuit 125.

The memory cell array 121 is connected with the decoder 122 through word lines WL and selection lines SSL and GSL. The memory cell array 121 is connected with the page buffer 123 through bit lines BL. The memory cell array 121 includes the plurality of memory cells BLK1 to BLKi. Each of the memory blocks BLK1 to BLKi includes a plurality of NAND cell strings. Data may be written to the memory cell array 121 on a page basis. An erase operation may be performed on a memory block basis According to some embodiments, the memory cell array 121 may be implemented with a three-dimensional (3D) memory array. The 3-dimensional memory array may be monolithically formed in one or more physical levels of a memory cell array having an active area arranged on a silicon substrate and a circuit related to an operation of memory cells.

In some embodiments, the 3D memory array may include vertical NAND strings that are vertically oriented such that at least one memory cell is located over another memory cell. The at least one memory cell includes a charge trap layer. Each vertical NAND string may include at least one selection transistor located over memory cells. At least one selection transistor may have the same structure as those of memory cells and may be monolithically formed together with memory cells.

The decoder 122 may select one of the memory blocks BLK1 to BLKi of the memory cell array 121 in response to an address ADD. The decoder 122 may provide a word line voltage corresponding to an operating mode to a word line of the selected memory block. The decoder 122 may provide selection signals to the selection lines SSL and GSL to select a memory block. In the read operation, a read voltage Vrd may be applied to a selected word line of a memory block and may provide a pass read voltage Vread to unselected words.

The page buffer 123 may operate as a write driver or a sense amplifier based on an operating mode. In a program operation, the page buffer 123 supplies, to a bit line of the memory cell array 121, a bit line voltage corresponding to data to be programmed. In the read operation, the page buffer 123 senses data stored in a selected memory cell through a bit line. The page buffer 123 latches the sensed data and outputs the latched data to the input/output buffer 124.

The input/output (I/O) buffer 124 provides write data received in the program operation to the page buffer 123. The input/output (I/O) buffer 124 outputs data provided from the page buffer 123 to the outside in the read operation. The input/output (I/O) buffer 124 may provide the received address or the received command to the control logic circuit 125 or the decoder 122.

The control logic circuit 125 controls the decoder 122 and the page buffer 123 in response to a command CMD and/or a control signal CTRL. The control logic circuit 125 may control the decoder 122 to generate biases in various different schemes depending on a program command. In particular, the control logic circuit 125 may output information about a program result depending on a request from the storage controller 110.

The number of word lines stacked in each of the memory blocks BLK1 to BLKi increases to implement a high-capacity memory device. Also, the number of bits of data to be stored in each of the memory cells increases. Accordingly, in the case of quickly identifying hot data and allocating the identified hot data to a memory block for storing the hot data, the number of times of a page copy occurring in garbage collection may decrease. As memory management is made by the unsupervised learning module 114 (refer to FIG. 1) according to various exemplary embodiments, the efficiency of garbage collection may be improved, and the lifetime of the storage device 100 may be extended.

Figure 4:
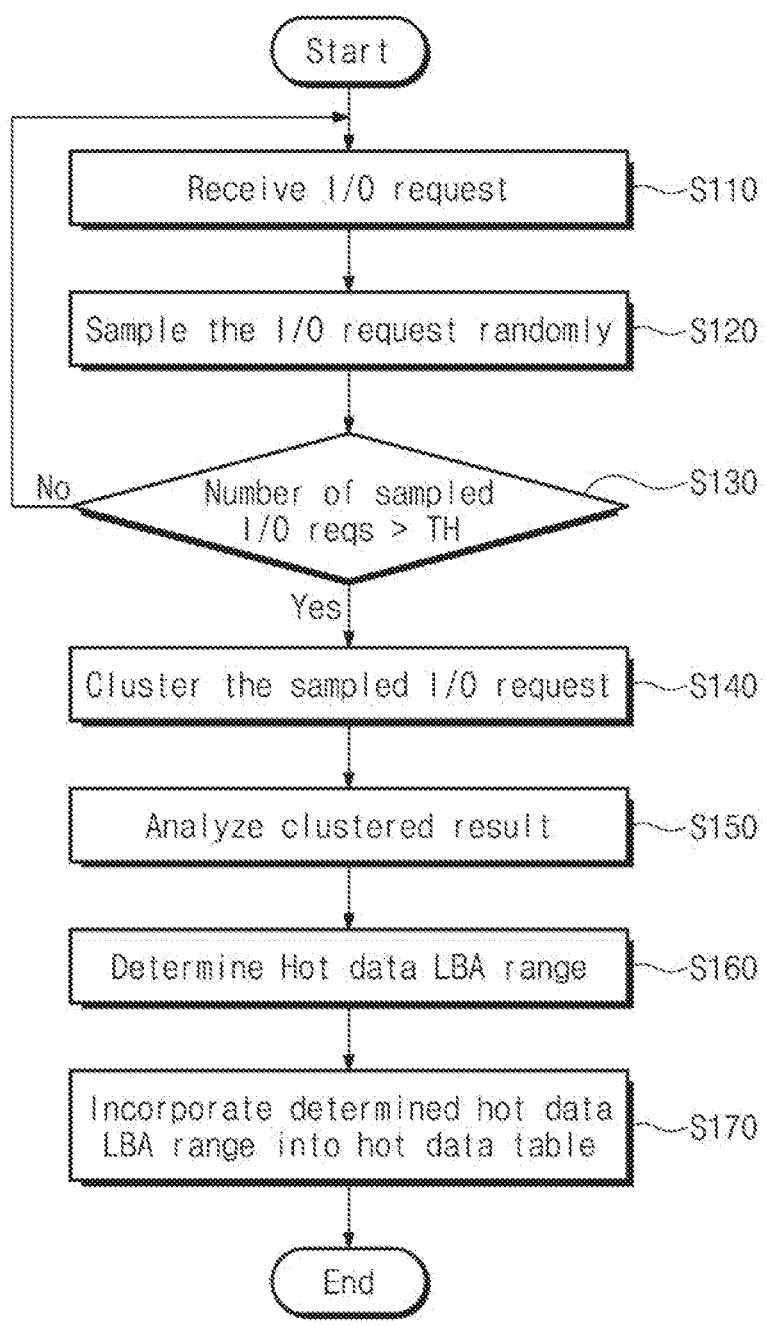
FIG. 4 is a flowchart illustrating a method in which a storage controller forms a hot data table by using an unsupervised learning algorithm, according to an embodiment.

FIG. 4 is a flowchart illustrating a method in which a storage controller forms the hot data table HDT by using an unsupervised learning algorithm, according to an embodiment. Referring to FIG. 4, the storage controller 110 samples input/output (I/O) requests from the host within the sampling period. The storage controller 110 may determine an LBA range corresponding to hot data from the sampling result.

In operation S110, the storage controller 110 receives an input/output (I/O) request from the host. When the input/output (I/O) request is received, the storage controller 110 may extract an LBA included in the input/output (I/O) request. For example, the input/output (I/O) request may include a write request, a read request, an erase request, etc. The input/output (I/O) request may include a logical block address LBA and a data size (e.g., a sector count).

In operation S120, the storage controller 110 randomly samples the input/output (I/O) request. The reason that the sampling occurs randomly is that many resources would be required to sample all received input/output (I/O) requests and overhead due to the calculation would become great. Accordingly, input/output (I/O) requests are randomly sampled such that the randomly sampled input/output (I/O) requests reflect characteristics of all input/output (I/O) requests. The sampled input/output (I/O) requests may be regarded as representing characteristics of all input/output (I/O) requests.

Sampling means obtaining and storing information about an LBA or a data size corresponding to a current input/output (I/O) request. Here, input/output (I/O) requests may be randomly sampled by using a random number. For example, when a generated random number is even-numbered, an input/output (I/O) request currently transmitted from the host may be sampled. In contrast, when a generated random number is odd-numbered, sampling of an input/output (I/O) request currently transmitted from the host may be skipped. However, it may be well understood that random sampling using a random number is only an example, and the way to randomly sample input/output (I/O) requests is not particularly limited. In other embodiments, a different method to randomly sample the input/output (I/O) requests may be used.

In operation S130, the storage controller 110 checks whether the number of sampled input/output (I/O) requests is greater than a threshold value TH. That is, the storage controller 110 may determine whether the number of sampled input/output (I/O) requests reaches a value (e.g., TH) capable of representing hot data and cold data during a given time. When it is determined that the number of sampled input/output (I/O) requests is greater than the threshold value TH (S130, Yes), the procedure proceeds to operation S140. In contrast, when it is determined that the number of sampled input/output (I/O) requests is not greater than the threshold value TH (S130, No), the procedure proceeds to operation S110 to perform additional sampling on input/output (I/O) requests.

In operation S140, the sampled input/output (I/O) requests are clustered. That is, the unsupervised learning module 114 of the storage controller 110 performs clustering by classifying LBAs or characteristics of the sampled input/output (I/O) requests. For example, an LBA included in an input/output (I/O) request may be targeted for clustering. For LBA clustering, the unsupervised learning module 114 may use a heuristic algorithm or an unsupervised learning scheme. In particular, at least one of algorithms such as a K-means algorithm, a DBSCAN algorithm, a Gaussian Mixture algorithm, or a BIRCH (Balanced Iterative Reducing and Clustering using Hierarchies) algorithm, etc. may be used for unsupervised learning.

In operation S150, the unsupervised learning module 114 analyzes the clustered LBAs. The unsupervised learning module 114 may analyze data of each of the clustered LBAs and may search for a cluster that has a strong random tendency (i.e., a random characteristic) and a relatively great overwrite ratio (i.e., an overwrite characteristic). For example, the unsupervised learning module 114 may calculate the following with respect to each LBA cluster: an LBA continuity count, an LBA overwrite ratio, an LBA range (LBA_min, LBA_max), a total I/O count, a total written size, an I/O interval, and/or a statistical value (e.g., an average/standard deviation/center value) of I/O requested sizes, etc. The unsupervised learning module 114 may extract various characteristic information about the LBA clusters, in addition to the above information, and may utilize the extracted information in a memory management operation.

For example, to obtain the LBA continuity count of one cluster, the unsupervised learning module 114 may align LBAs of input/output (I/O) requests belonging to the cluster in an ascending order of input times of the LBAs. Based on the aligned LBAs, the unsupervised learning module 114 may calculate whether a value being a result of adding an LBA and a requested data size input at a time "t" is equal to a value of an LBA at a time "t+1". The case where the value corresponding to the time "t" is equal to a value of the LBA corresponding to the time "t+1" corresponds to LBA continuity, and the case where the value corresponding to the time "t" is not equal to a value of the LBA corresponding to the time "t+1" corresponds to LBA discontinuity. With regard to one cluster, the number of times an LBA continuity is detected corresponds to the LBA continuity count. When a ratio of the LBA continuity count to a total I/O count of a cluster is a reference ratio or more, the corresponding cluster may be determined as a sequential cluster. In contrast, when the ratio of the LBA continuity count to the total I/O count of the cluster is less than the reference ratio, the corresponding cluster may be determined as a random cluster.

In operation S160, the unsupervised learning module 114 determines a hot data LBA range based on a result of the analysis performed in operation S150. For example, the unsupervised learning module 114 may determine clusters, which have a ratio of an LBA continuity count to a total I/O count that is less than the reference ratio, as a hot data range. Alternatively, the unsupervised learning module 114 may determine a cluster having an LBA overwrite ratio higher than a reference value as a hot data range.

In operation S170, the unsupervised learning module 114 may incorporate the determined hot data range into the hot data table. For example, the unsupervised learning module 114 may newly register the determined hot data range in the hot data table HDT or may update the hot data table HDT with the determined hot data range. Whether an input/output (I/O) request input after operation S170 corresponds to hot data may be identified by using the updated hot data table HDT.

Sampling, clustering, and analysis may be performed on input/output (I/O) requests within the sampling period by the storage controller 110. The storage controller 110 may generate the hot data table HDT based on the analysis result.

Figure 5:
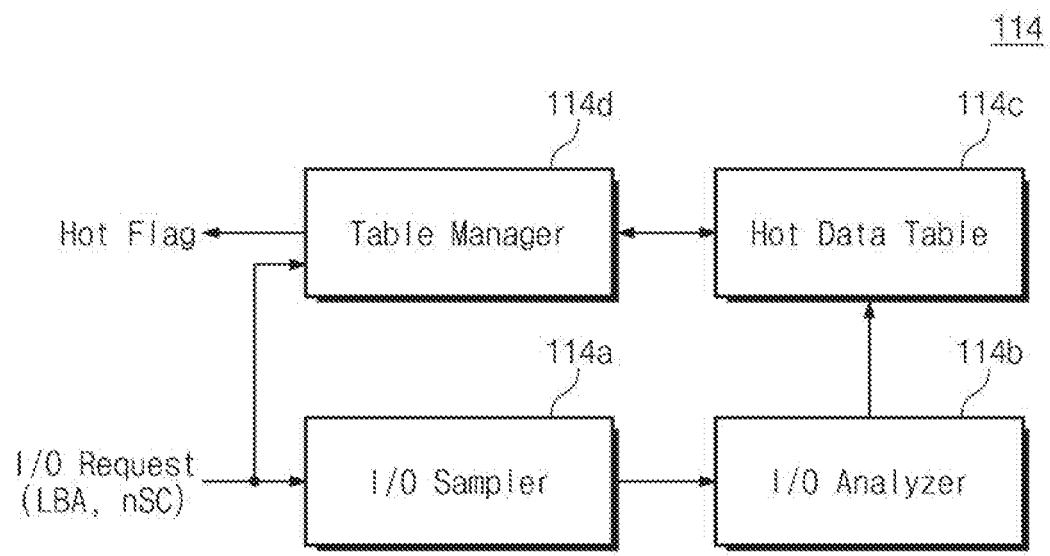
FIG. 5 is a block diagram illustrating a characteristic of an unsupervised learning module according to an embodiment.

FIG. 5 is a block diagram illustrating a characteristic of the unsupervised learning module 114 according to an embodiment. Referring to FIG. 5, the unsupervised learning module 114 may include an input/output (I/O) sampler 114a, an input/output (I/O) analyzer 114b, a hot data table 114c, and a table manager 114d.

The input/output (I/O) sampler 114a and the input/output (I/O) analyzer 114b are activated during the sampling period. During the sampling period, the input/output (I/O) sampler 114a and the input/output (I/O) analyzer 114b may analyze input/output (I/O) requests and may update the hot data table 114c. With regard to all input/output (I/O) requests transmitted after the sampling period, the table manager 114d determines whether a received input/output (I/O) request is associated with hot data, with reference to the hot data table 114c. The sampling period is repeated after the sampling cycle. The hot data table 114c may be updated in units of a sampling cycle.

When an input/output (I/O) request is received, the input/output (I/O) request may be provided to the input/output (I/O) sampler 114a and the table manager 114d. First, the input/output (I/O) sampler 114a randomly samples input/output (I/O) requests. The input/output (I/O) sampler 114a may extract a command, an LBA, a data size, etc. included in the received input/output (I/O) request. The input/output (I/O) sampler 114a may perform random sampling by using a random number, or other method as described above.

The input/output (I/O) analyzer 114b analyzes the sampled input/output (I/O) requests and determines an LBA range corresponding to hot data. For example, as described above, the input/output (I/O) analyzer 114b clusters the sampled input/output (I/O) requests depending on characteristics such as discontinuity, continuity, and/or an overwrite ratio, etc. For LBA clustering, the input/output (I/O) analyzer 114b may use a heuristic algorithm, or an unsupervised learning algorithm, such as a K-means algorithm, a DBSCAN algorithm, a Gaussian Mixture algorithm, or a BIRCH (Balanced Iterative Reducing and Clustering using Hierarchies) algorithm, etc. The input/output (I/O) analyzer 114b may analyze the clustered LBAs and data and may search for a cluster that has a strong random tendency and a relatively great overwrite ratio. That is, the input/output (I/O) analyzer 114b may calculate the following with respect to each LBA cluster: an LBA continuity count, an LBA overwrite ratio, an LBA range (LBA_min, LBA_max), a total I/O count, a total written size, an I/O interval, and/or a statistic value (e.g., an average/standard deviation/center value) of I/O requested sizes, etc.

The input/output (I/O) analyzer 114b determines a hot data range based on a result of analyzing each cluster. For example, in some embodiments, the input/output (I/O) analyzer 114b may determine random clusters, which are analyzed as having a ratio of an LBA continuity count to a total I/O count of a cluster that is less than the reference ratio, as a hot data range. Alternatively, in other embodiments, the input/output (I/O) analyzer 114b may determine a cluster having an LBA overwrite ratio higher than a reference value as a hot data range. The input/output (I/O) analyzer 114b may register the determined hot data range in the hot data table HDT or may update the hot data table HDT with the determined hot data range.

An LBA range corresponding to hot data is stored in the hot data table 114c. In addition to an LBA range, statistical information of each of clusters corresponding to hot data may also be stored in the hot data table 114c. The hot data table 114c may be updated during the sampling period repeated every sampling cycle.

When an input/output (I/O) request is received from the host, the table manager 114d may search the hot data table 114c and determine whether an LBA corresponding to an input/output (I/O) request corresponds to a hot data area. When an LBA of an input/output (I/O) request is found as being included in the hot data range, the table manager 114d may generate and return a hot flag to the storage controller 110. In this case, the storage controller 110 may allocate a memory block for processing an input/output (I/O) request depending on the hot flag. For example, the storage controller 110 may allocate input/output (I/O) data, which are determined as hot data, to a first memory block. In contrast, the storage controller 110 may allocate input/output (I/O) data, which are determined as being not hot data (i.e., as cold data), to a second memory block different from the first memory block.

Exemplary functions and operations of the unsupervised learning module 114 are described above by using a block diagram. In some embodiments, the unsupervised learning module 114 may be provided in the storage controller 110 in the form of firmware or software executed by the processor 111. Alternatively, in some embodiments, the input/output (I/O) sampler 114a, the input/output (I/O) analyzer 114b, the hot data table 114c, and the table manager 114d of the unsupervised learning module 114 may be implemented in the form of hardware circuitry. For example, in some embodiments, the input/output (I/O) sampler 114a, the input/output (I/O) analyzer 114b, the hot data table 114c, and the table manager 114d of the unsupervised learning module 114 may be implemented in the form of an intellectual property (or function block).

Figure 6:
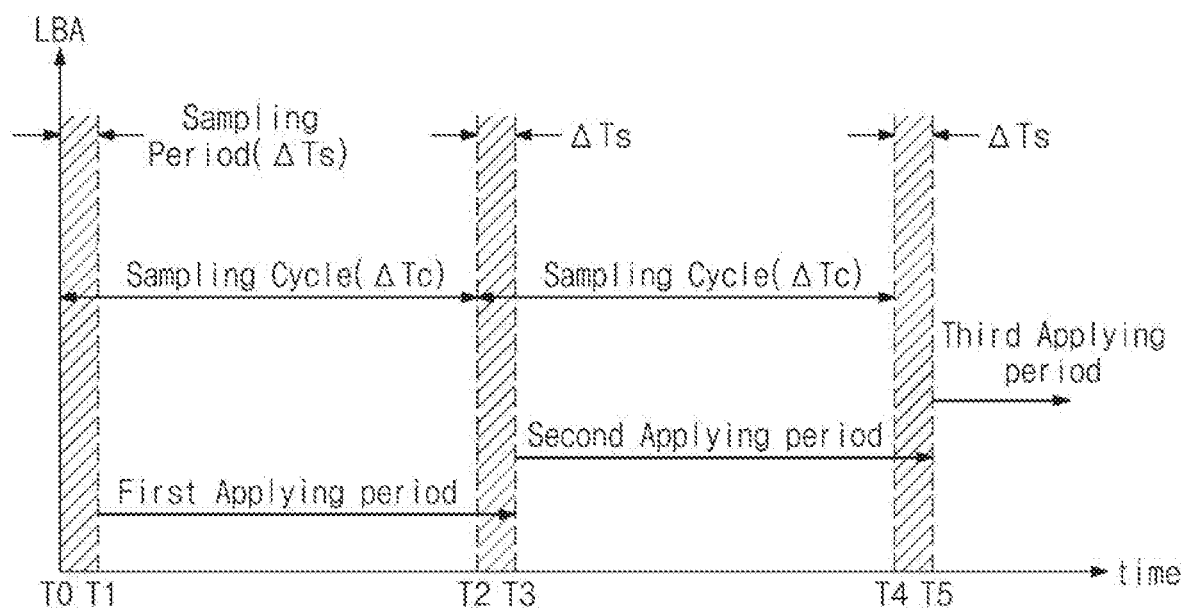
FIG. 6 is a diagram illustrating a sampling period, in which an unsupervised learning module according to an embodiment performs sampling on input/output requests, and a sampling cycle.

FIG. 6 is a diagram illustrating a sampling period, in which an unsupervised learning module according to an embodiment performs sampling on input/output (I/O) requests, and a sampling cycle. Referring to FIG. 6, the unsupervised learning module 114 may update the hot data table 114c by sampling and analyzing input/output (I/O) requests during a sampling period $\Delta Ts$ in a runtime of the storage device 100 (refer to FIG. 1). The sampling period $\Delta Ts$ is repeated every sampling cycle $\Delta Tc$.

During the sampling period $\Delta Ts$ from a time T0 to a time T1, sampling, clustering, and analysis are performed by the input/output (I/O) sampler 114a and the input/output (I/O)

analyzer 114b. During the period ΔTs from the time T0 to a time T1, the input/output (I/O) sampler 114a randomly samples input/output (I/O) requests. During the sampling period ΔTs, the input/output (I/O) analyzer 114b clusters and analyzes the sampled input/output (I/O) requests. The input/output (I/O) analyzer 114b determines a hot data LBA range based on the analysis result. The input/output (I/O) analyzer 114b may register the determined hot data range in the hot data table 114c or may update the hot data table 114c with the determined hot data range.

From the time T1 to a time T3, whether a received input/output (I/O) request corresponds to hot data is identified by the hot data table 114c. That is, a first applying period based on the updated hot data table 114c corresponds to an interval from the time T1 to the time T3. Input/output (I/O) requests received between the time T1 and to a time T2 are not sampled. Sampling of an input/output (I/O) request is resumed at the time T2 when the sampling cycle ΔTc elapses from the time T0.

During the sampling period ΔTs from the time T2 to the time T3, sampling, clustering, and analysis are performed by the input/output (I/O) sampler 114a and the input/output (I/O) analyzer 114b. During the period ΔTs from the time T2 to the time T3, the input/output (I/O) sampler 114a randomly samples input/output (I/O) requests. During the sampling period ΔTs, the input/output (I/O) analyzer 114b clusters and analyzes the sampled input/output (I/O) requests. The input/output (I/O) analyzer 114b may determine a hot data LBA range based on the analysis result and may update the hot data table 114c.

Whether an input input/output (I/O) request received from the time T3 to a time T5 corresponds to hot data is identified by the hot data table 114c updated at the time T3. That is, a second applying period based on the updated hot data table 114c corresponds to an interval from the time T3 to the time T5. Input/output (I/O) requests received between the time T3 and to a time T4 are not sampled. Sampling of an input/output (I/O) request is resumed at the time T4 when the sampling cycle ΔTc elapses from the time T2.

Sampling of an input/output (I/O) request and updating of the hot data table 114c are performed from the time T4 to the time T5. Whether an input input/output (I/O) request received from the time T5 corresponds to hot data is identified by the hot data table 114c updated at the time T5. A third applying period based on the updated hot data table 114c starts from the time T5.

Thus, as illustrated in FIG. 6, sampling of an input/output (I/O) request is randomly performed during the sampling period ΔTs. The sampling period ΔTs may be repeated every sampling cycle ΔTc.

Figure 7:
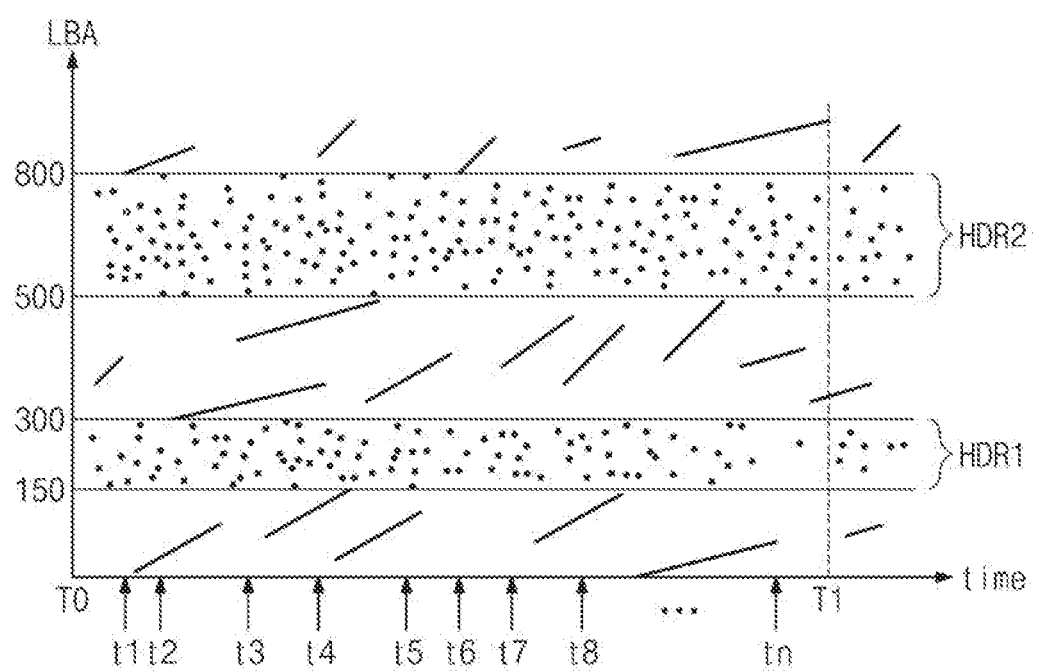
FIG. 7 is a diagram illustrating input/output requests sampled by an unsupervised learning module in a sampling period of FIG. 6.

FIG. 7 is a diagram illustrating an input/output request sampled by an unsupervised learning module in the sampling period T0 to T1 of FIG. 6, according to an embodiment. In FIG. 7, a horizontal axis represents time, and a vertical axis represents an LBA. Hot data ranges HDR1 and HDR2 may be detected with reference to "n" input/output (I/O) requests randomly sampled during the sampling period.

It is assumed that "n" input/output (I/O) requests are sampled by the unsupervised learning module 114 during the sampling period T0 to T1. Input/output (I/O) requests are respectively sampled at sampling times t1, t2, t3, . . . , tn. The unsupervised learning module 114 obtains and stores information about an LBA and/or a data size corresponding to an input/output (I/O) request at each sampling time. Here, the sampling times t1, t2, t3, . . . , tn may be randomly determined by using a random number, as discussed above.

A pattern of input/output (I/O) requests belonging to an LBA range below "150" has a linear characteristic having a give slope over time, as illustrated by the lines in FIG. 7. In this case, this linear characteristic may mean input/output (I/O) requests, of which LBAs continuously increase like stream data. Accordingly, the number of times that the same LBA is repeatedly requested is very little. In contrast, it may be observed that an input/output (I/O) request is randomly made on data of a relatively small size over time in an LBA range from "150" to "300".

In the case where input/output (I/O) requests are detected like a pattern illustrated in FIG. 7, LBA ranges 150 to 300 and 500 to 800 in which an LBA continuity count is relatively small may be determined as hot data ranges HDR1 and HDR2.

FIG. 8 is a table illustrating a method of analyzing sampled and clustered input/output (I/O) requests. Referring to FIG. 8, the unsupervised learning module 114 may analyze clustered input/output (I/O) requests. The unsupervised learning module 114 may determine an LBA range corresponding to hot data by using the analysis result and may update the hot data table 114c with the determined data.

The unsupervised learning module 114 may analyze input/output (I/O) requests clustered in units of an LBA depending on various characteristics. Here, it is possible to analyze each of a plurality of clusters classified depending on LBA ranges. The unsupervised learning module 114 may calculate the following with respect to each LBA cluster: an LBA range (LBA_min, LBA_max), an LBA continuity count, an LBA overwrite ratio, an average I/O interval, a total I/O count, a total written size, an average I/O interval, and/or a statistical value (e.g., a request size average, a request size standard deviation, and/or a request size center value) of I/O requested sizes, etc.

For example, the unsupervised learning module 114 may calculate characteristic information with respect to a first cluster corresponding to an LBA range "0" to "149". That is, the unsupervised learning module 114 may calculate the LBA continuity count of the first cluster and may determine the LBA continuity count as "50". Also, the LBA overwrite ratio may be calculated as "0" by the unsupervised learning module 114, the average I/O interval as "500 ms", the total I/O count as "5", the total written size as "560M" (i.e., 560 Mbytes), the request size average (i.e., the average size of write-requested data) as "250 M" (i.e., 250 Mbytes), and the request size standard deviation (i.e., the standard deviation of write-requested data) as "120". The calculation and analysis of the characteristic information may be performed in a similar manner on each cluster 1, 2, . . . , n.

The unsupervised learning module 114 may analyze characteristics of each cluster and may use the analysis results to determine hot data ranges. In addition, the unsupervised learning module 114 may search for a cluster, which has a strong random tendency and a relatively great overwrite ratio, based on the analysis result of each cluster, and determine the LBA range corresponding to the cluster as a hot data range. For example, in the example illustrated in FIG. 8, the LBA ranges corresponding to the cluster 2 and the cluster 4 may be determined as hot data ranges. In some embodiments, the unsupervised learning module 114 may classify clusters, which are classified as hot data, into more subdivided levels based on the analyzed characteristic information. In addition, in some embodiments, the unsupervised learning module 114 may extract various characteristic information about LBA clusters, in addition to the above analyzed information, and may utilize the extracted information in a memory management operation.

The unsupervised learning module 114 may determine an LBA range of hot data based on the analysis result. The unsupervised learning module 114 may update the hot data table HDT with the determined hot data LBA range.

Figure 9:
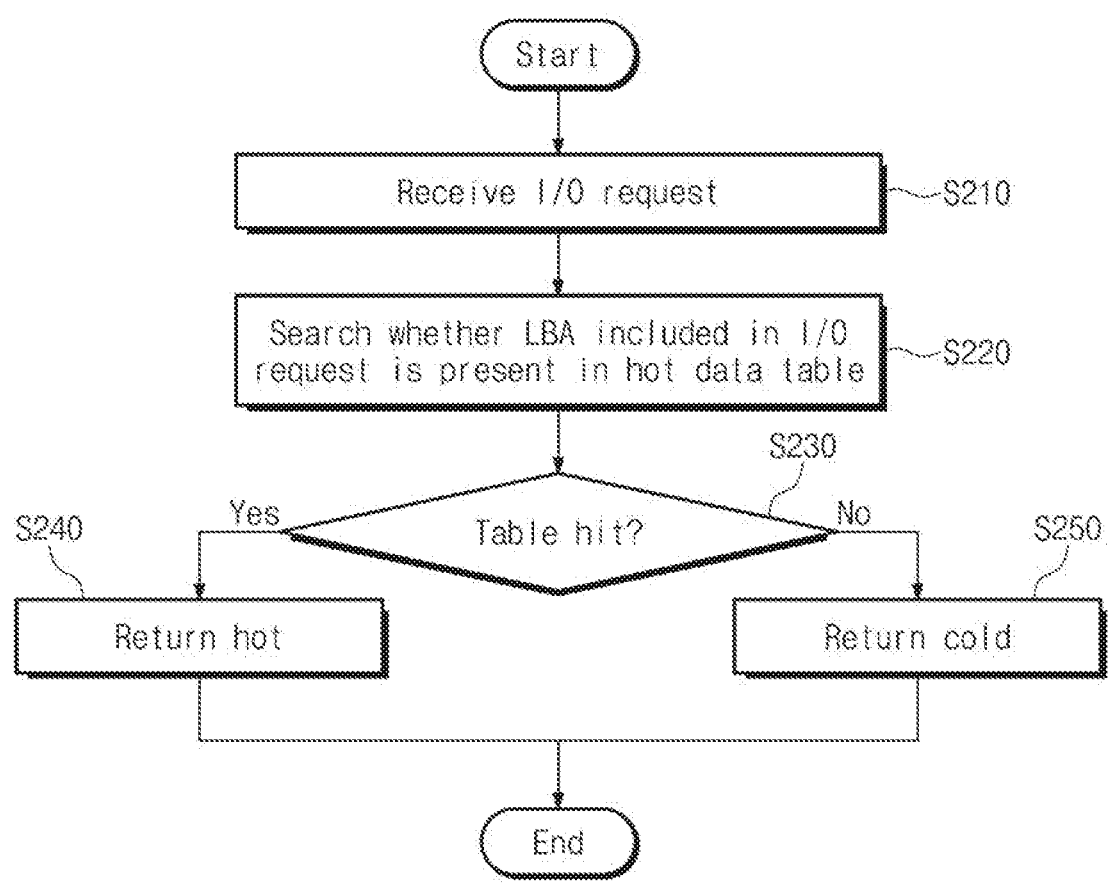
FIG. 9 is a flowchart illustrating a method of using a hot data table according to an embodiment.

FIG. 9 is a flowchart illustrating a method of using a hot data table according to an embodiment. Referring to FIG. 9, the table manager 114d (refer to FIG. 5) may determine whether an input/output (I/O) request received from the host corresponds to hot data, with reference to the hot data table 114c.

In operation S210, the table manager 114d receives an input/output (I/O) request from the host. When the input/output (I/O) request is received, the table manager 114d may selectively receive an LBA included in the input/output (I/O) request.

In operation S220, the table manager 114d may search whether the LBA included in the input/output (I/O) request is present in the hot data table 114c.

In operation S230, the table manager 114d may determine a hit or miss of the LBA included in the input/output (I/O) request based on the search. The table manager 114d performs an operation branch depending on whether there occurs a hit of the LBA of the input/output (I/O) request. When the LBA included in the input/output (I/O) request is present in the hot data table 114c (S230, Yes), the procedure proceeds to operation S240. When the LBA included in the input/output (I/O) request is absent from the hot data table 114c (S230, No), the procedure proceeds to operation S250.

In operation S240, the table manager 114d may return "hot" to the storage controller 110. That is, the table manager 114d may inform the storage controller 110 that I/O requested data are hot data.

In operation S250, the table manager 114d may return "cold" to the storage controller 110. That is, the table manager 114d may inform the storage controller 110 that I/O requested data are cold data.

The storage controller 110 receives hot or cold information returned from the table manager 114d and may allocate a memory block for the purpose of processing the corresponding input/output (I/O) request. In this case, data classified as hot data and data classified as cold data may be respectively allocated to different memory blocks.

FIG. 10 is a diagram illustrating a hot data table according to an embodiment. Referring to FIG. 10, a hot data table HDT may define an LBA range (LBA_min, LBA_max) corresponding to hot data and a hot intensity of each cluster corresponding to hot data.

The unsupervised learning module 114 may determine clusters "2" and "4" respectively corresponding to hot data ranges from among a plurality of clusters, as corresponding to hot data (see FIG. 8). In addition, the unsupervised learning module 114 may give a hot intensity to each of the clusters "2" and "4" corresponding to hot data through an additional analysis. For example, the unsupervised learning module 114 may determine a hot intensity with reference to at least one of an LBA continuity count, an LBA overwrite ratio, a total I/O count, a total written size, an average I/O interval, or a statistical value (e.g., an average/standard deviation/center value) of I/O requested sizes of each of the clusters "2" and "4". A hot intensity of a higher level may be given to a cluster (or an LBA range), in which the overwrite ratio is relatively high or the LBA continuity count is relatively small, from among clusters (or LBA ranges) each corresponding to hot data.

Different memory blocks may be allocated to clusters designated as hot data, depending on the hot intensities. For example, a hot intensity of "2" may be given to a second cluster (cluster 2) determined as a hot data area. For example, a hot intensity of "1" may be given to a fourth cluster (cluster 4) determined as a hot data area. Data included in the second cluster and data included in the fourth cluster may be classified as hot data but may be programmed to different memory blocks.

The case where hot intensities of different levels are given to clusters depending on characteristics of hot data is described above. In the case where hot data of different hot intensities are programmed to different memory blocks, the number of times of a page copy occurring in a garbage collection operation may decrease.

Figure 11:
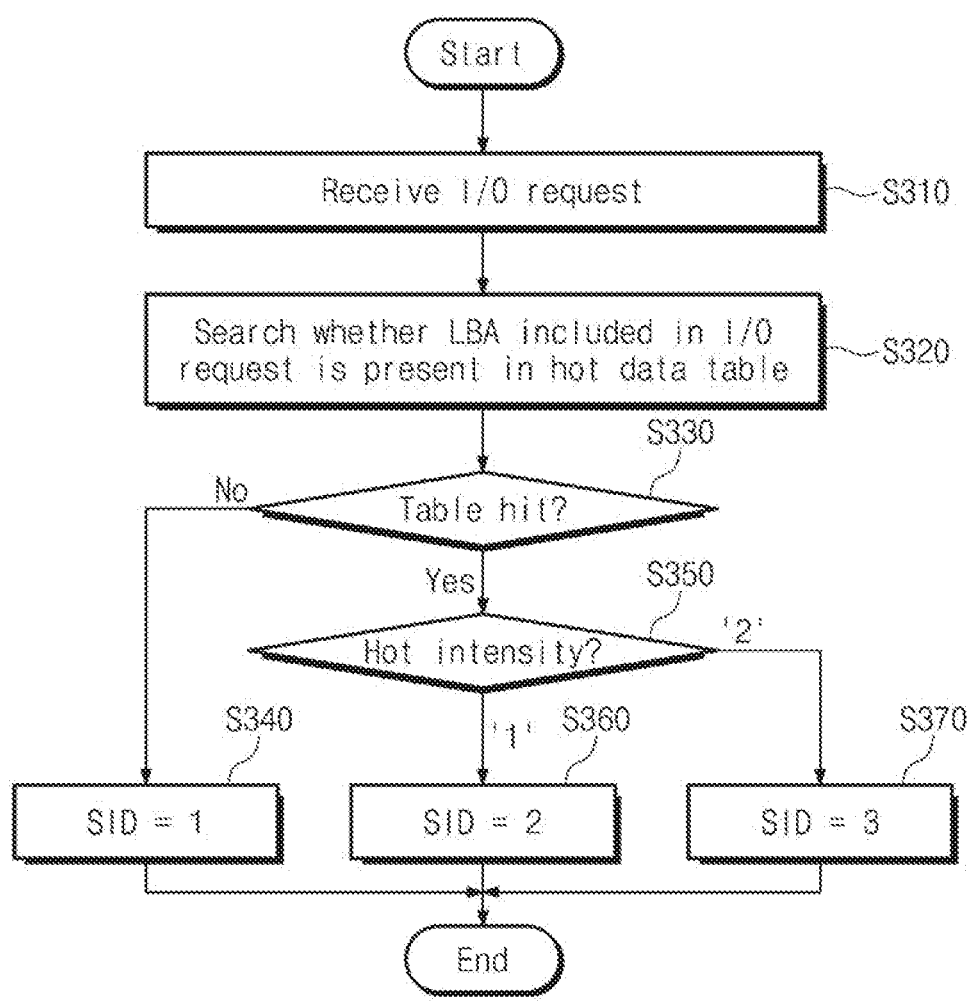
FIG. 11 is a flowchart illustrating a method of processing an input/output request by using the hot data table of FIG. 10, according to an embodiment.

FIG. 11 is a flowchart illustrating a method of processing an input/output (I/O) request by using a hot data table, according to an embodiment. FIG. 11 is described with reference to the example of the hot data table illustrated in FIG. 10. Referring to FIGS. 10-11, the table manager 114d (refer to FIG. 5) may allocate different memory blocks or different stream identifiers SID to hot data, of which hot intensities are at least two or more in number.

In operation S310, the table manager 114d receives an input/output (I/O) request from the host. When the input/output (I/O) request is received, the table manager 114d may receive an LBA included in the input/output (I/O) request.

In operation S320, the table manager 114d may search whether the LBA included in the input/output (I/O) request is present in the hot data table 114c. That is, the table manager 114d may determine a hit or miss of the LBA included in the input/output (I/O) request with reference to the hot data table 114c.

In operation S330, the table manager 114d may determine a hit or miss of the LBA included in the input/output (I/O) request based on the search. When the LBA included in the input/output (I/O) request is present in the hot data table 114c (S330, Yes), the procedure proceeds to operation S350. When the LBA included in the input/output (I/O) request is absent from the hot data table 114c (S330, No), the procedure proceeds to operation S340.

In operation S340, the table manager 114d may return "1" as a stream identifier SID with respect to the currently received input/output (I/O) request.

In operation S350, the table manager 114d checks a hot intensity designated in the hot data table. Referring to the example of the hot data table illustrated in FIG. 10, when the hot intensity of the currently received input/output (I/O) request is found as "1", the procedure proceeds to operation S360. In contrast, when the hot intensity of the currently received input/output (I/O) request is found as "2", the procedure proceeds to operation S370.

In operation S360, the table manager 114d may return "3" as a stream identifier SID with respect to the currently received input/output (I/O) request. In operation S370, the table manager 114d may return "3" as a stream identifier SID with respect to the currently received input/output (I/O) request.

In operation S360 and operation S370, different stream identifiers SID may be respectively allocated to data that correspond to hot data but have different hot intensities. That different stream identifiers are allocated to data means that the data are allocated to different memory blocks of a storage device of a multi-stream scheme. Accordingly, it may be understood that data determined as hot data are also managed in different schemes depending on hot intensities.

Figure 12:
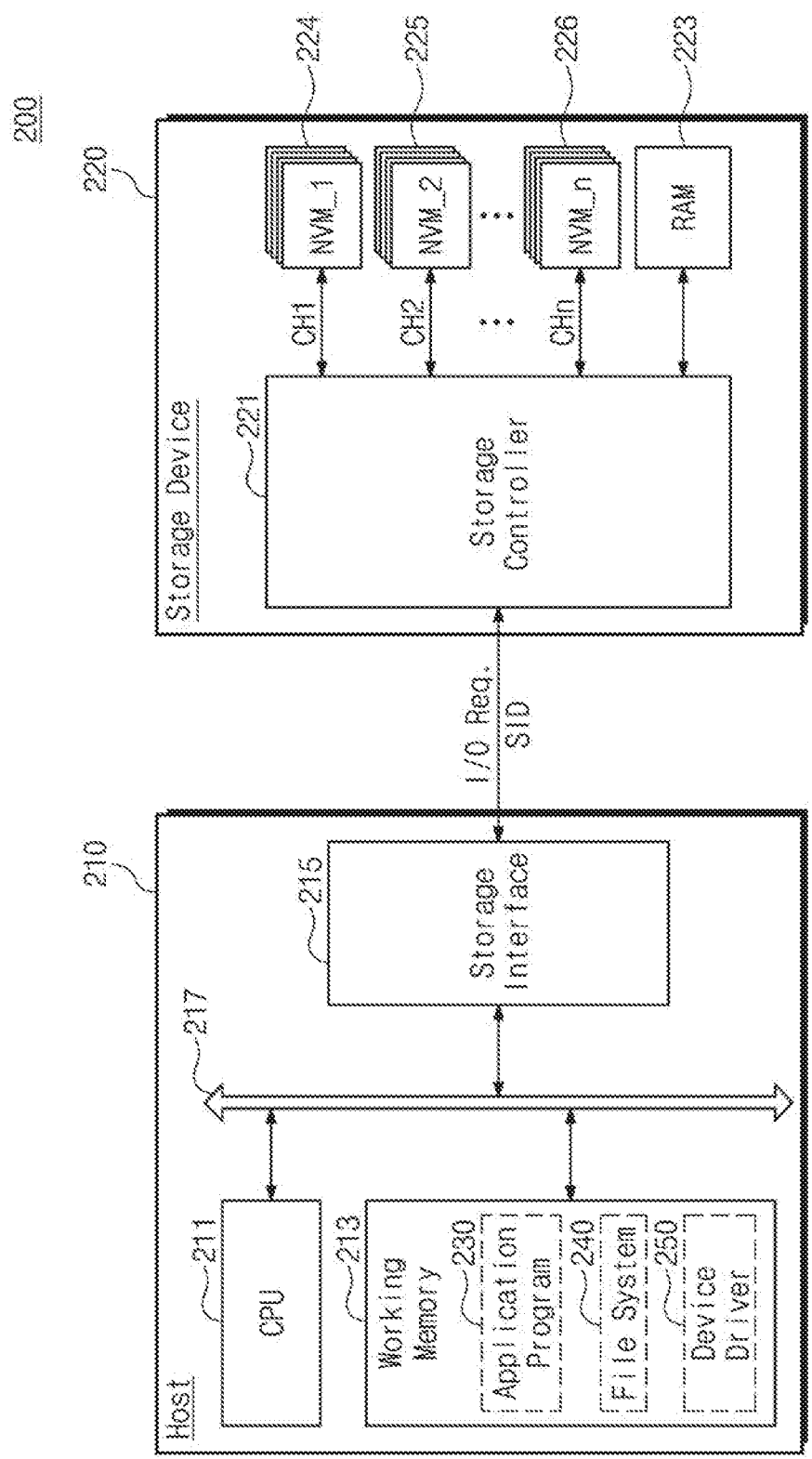
FIG. 12 is a block diagram illustrating a memory system according to another embodiment.

FIG. 12 is a block diagram illustrating a memory system according to another embodiment. Referring to FIG. 12, in a memory system 200, a host 210 may determine whether an input/output (I/O) request corresponds to hot data before transmitting the input/output (I/O) request to a storage device 220. The host 210 may transmit a stream identifier SID corresponding to an input/output (I/O) request to the storage device 220, depending on whether the input/output (I/O) request corresponds to hot data.

The host 210 may write data to the storage device 220 or may read data stored in the storage device 220. The host 210 generates a command for writing data to the storage device 220 or reading data stored in the storage device 220. The host 210 includes a central processing unit 211, a working memory 213, a storage interface 215, and a system bus 217.

The central processing unit 211 executes a variety of software (e.g., an application program, an operating system, and a device driver) loaded onto the working memory 213. The central processing unit 211 may execute an operating system OS and application programs. The central processing unit 211 may be implemented with a homogeneous multi-core processor or a heterogeneous multi-core processor.

The operating system OS to be executed by the central processing unit 211 or data to be processed by the central processing unit 211 are loaded onto the working memory 213. An application program 230, a file system 240, a device driver 250, etc. may be loaded onto the working memory 213. In particular, the device driver 250 that performs interfacing with the storage device 220 may be loaded and executed onto the working memory 213. The device driver 250 may perform the same function as the unsupervised learning module 114 of FIG. 1. That is, the device driver 250 may sample an input/output (I/O) request to be transferred from the application program 230 or the file system 240 to the storage device 220 and may determine whether the input/output (I/O) request corresponds to hot data by using the sampling result. The device driver 250 may cluster sampled LBAs by using the unsupervised learning algorithm. The device driver 250 may generate the hot data table HDT by using a result of the clustering. The hot data table HDT may include the following statistical information about hot data: an LBA range, an overwrite ratio, an input/output (I/O) count, an input/output (I/O) interval, and/or an input/output (I/O) request, etc. In addition, a variety of software for driving devices of the host 210 may be loaded onto the working memory 213.

The storage interface 215 provides a physical connection between the host 210 and the storage device 220. That is, the storage interface 215 converts a command, an address, data, etc. corresponding to various access requests generated from the host 210 so to be suitable for a scheme to interface with the storage device 220. The storage interface 215 may include at least one of protocols such as universal serial bus (USB), small computer system interface (SCSI), PCI express, ATA, parallel ATA (PATA), serial ATA (SATA), and/or serial attached SCSI (SAS), etc.

The storage device 220 may include a storage controller 221, a random access memory (RAM) 223, and nonvolatile memory devices 224, 225, and 226. The storage device 220 may access the nonvolatile memory devices 224, 225, and 226 in response to a command CMD from the host 210 or may perform various requested operations. The storage device 220 may select a memory block for the purpose of processing an input/output (I/O) (I/O) request provided from the host 210. The storage device 220 may allocate or select a memory block depending on the stream identifier SID provided from the host 210. That is, unlike the storage device 100 of FIG. 1, the storage device 220 may allocate a memory block corresponding to the stream identifier SID of the host 210.

Figure 13:
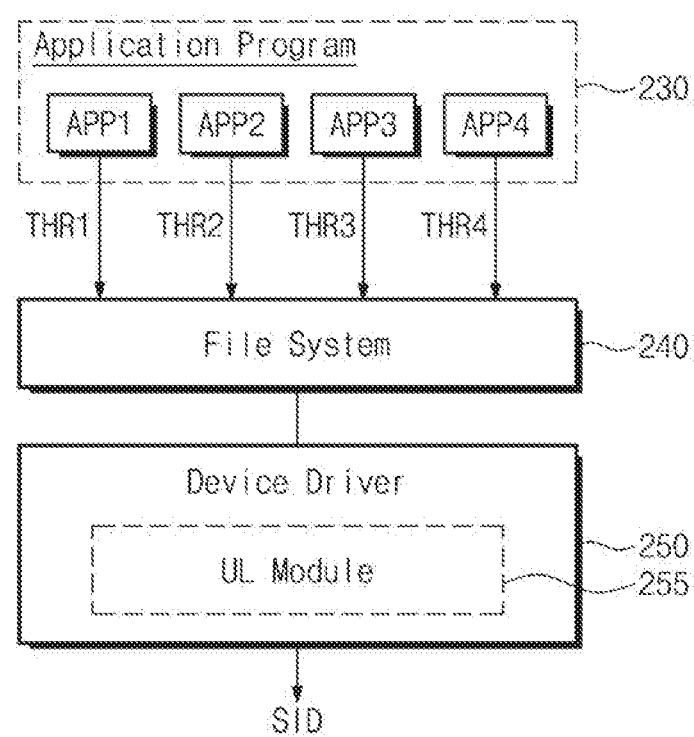
FIG. 13 is a block diagram illustrating a software structure of a host of the memory system illustrated in FIG. 12, according to an embodiment.

FIG. 13 is a block diagram illustrating a software structure of the host 210 of the memory system 200 illustrated in FIG. 12, according to an embodiment. The software structure of the host 210 may be executed by the central processing unit 211 of the host 210. Referring to FIG. 13, the device driver 250 may sample an access request to be transferred from the application program 230 or the file system 240 to the storage device 220 by using unsupervised learning and may generate the stream identifier SID depending on the sampling result.

The application program 230 is provided as a program for managing the storage device 220. The application program 230 may be provided, for example, as a dedicated program for controlling the storage device 220. The application program 230 may include a plurality of application programs APP1, APP2, APP3, and APP4. Each of the plurality of application programs APP1, APP2, APP3, and APP4 may transmit input/output (I/O) requests of a hot data pattern or a cold data pattern to the file system 240 depending on characteristics.

The file system 240 is defined as a set of abstract data structures for hierarchically storing, searching, accessing, and manipulating data at an operating system (OS) layer. That is, the file system 240 may convert data, which are accessed and requested by an upper program (e.g., the operating system OS or the application program 230), from a file unit into a management unit of the device driver 250. For example, when a write request of a specific file is transmitted from the application program 230, the file system 240 opens the file and transmits write-requested data to the device driver 250.

The device driver 250 may be a control module for controlling the storage device 220 at the operating system (OS) level. When an access to the storage device 220 is requested by a user or by the plurality of application programs APP1, APP2, APP3, and APP4, the device driver 250 is called. The device driver 250 may be implemented with a software module of the kernel for controlling the storage device 220.

The device driver 250 may include an unsupervised learning (UL) module 255. The unsupervised learning module 255 samples requests from the file system 240 and clusters sampled LBAs through unsupervised learning. The unsupervised learning module 255 may analyze a result of the clustering and may generate the hot data table HDT. The hot data table HDT may include the following statistical information about hot data: an LBA range, an overwrite ratio, an input/output (I/O) count, an input/output (I/O) interval, and/or an input/output (I/O) request, etc.

The unsupervised learning module 255 may determine whether a received input/output (I/O) request is associated with an LBA corresponding to hot data, with reference to the hot data table HDT. The hot data table HDT is used to manage address area-based information about an LBA range, not information about LBAs of a specific range. The hot data table HDT may provide information capable of determining whether an LBA included in the received input/output (I/O) request is included in a hot data area. Accordingly, in the case of using the hot data table HDT, it is possible to identify at high speed hot data with respect to all LBAs received. In addition, in the case where the device driver 250 of the host 210 identifies hot data or cold data, the device driver 250 of the host 210 may generate the stream identifier SID depending on the identification result.

Here, the description is given that the unsupervised learning module 255 is included in the device driver 250, but exemplary embodiments are not limited thereto. For example, the unsupervised learning module 255 may be provided in the form of a software module or a hardware function block independent of the device driver 250.

Figure 14:
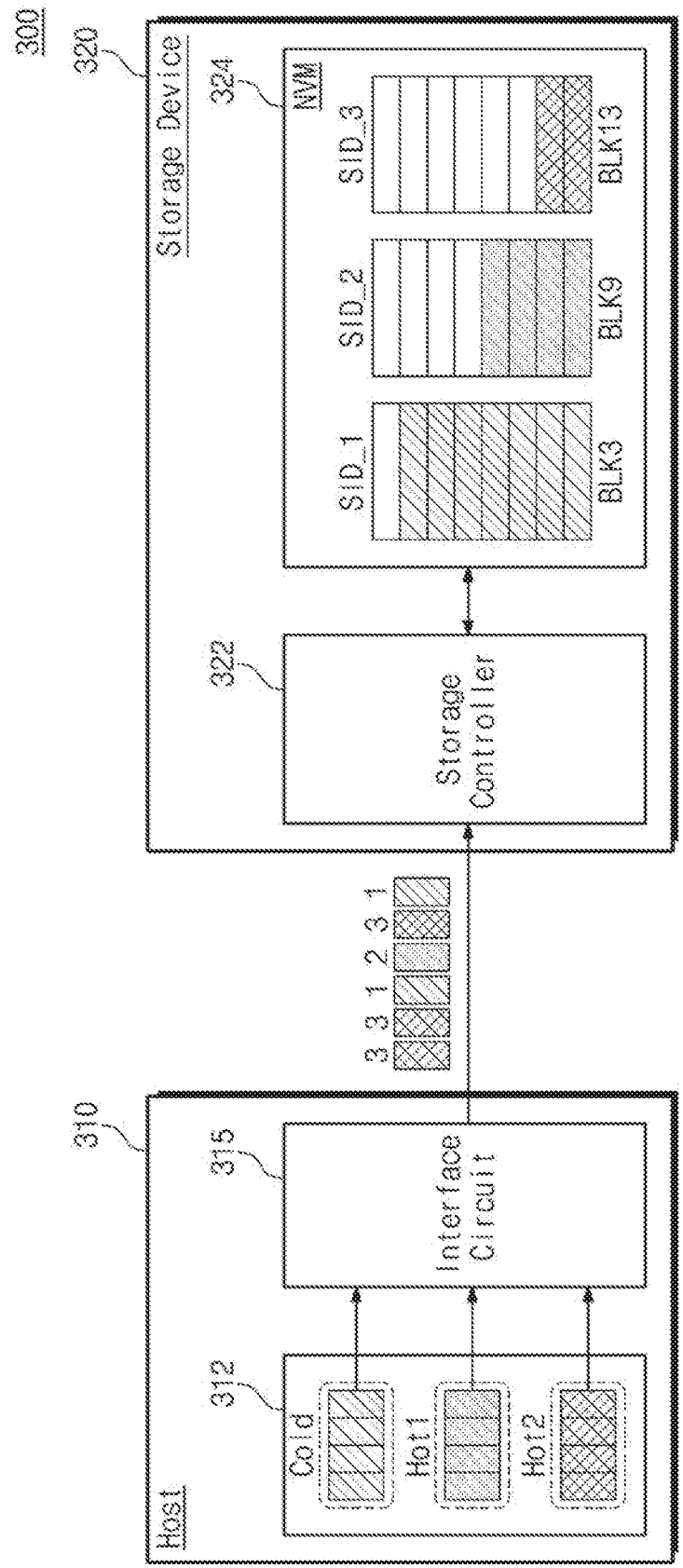
FIG. 14 is a block diagram illustrating a memory system according to another embodiment.

FIG. 14 is a block diagram illustrating a memory system according to another embodiment. A memory system 300 may include a host 310 and a storage device 320. The hardware configuration of the host 310 and the storage device 320 may be similar to the hardware configuration of the host 210 and the storage device 220, respectively, illustrated in FIG. 12 and thus a repeated description thereof is omitted for conciseness. Referring to FIG. 14, the host 310 may transmit data to the storage device 320 in a multi-stream scheme. In particular, the host 310 may form the hot data table HDT by using the unsupervised learning algorithm and, when an input/output (I/O) request is generated, the host 310 may generate the stream identifier SID with reference to the hot data table HDT. This will be described in detail below.

The host 310 may allocate different stream identifiers SID indicating hot data and cold data to input/output (I/O) requests by using the hot data table HDT and may transmit the input/output (I/O) requests to the storage device 320. A device driver 312 of the host 310 may classify data into different streams depending on whether the data are hot or cold. The device driver 312 may classify a stream corresponding to cold data as a first stream Stream_1 and may allocate a stream identifier SID_1 to the cold data. In contrast, the device driver 312 may classify hot data Hot1, which are frequently updated or has a high random tendency, as a second stream Stream_2 and may allocate a stream identifier SID_2 to the hot data Hot1. In addition, the device driver 312 may classify hot data Hot2, which has a higher random tendency than the hot data Hot1 or is higher in update frequency than the hot data Hot1, as a third stream Stream_3 and may allocate a stream identifier SID_3 to the hot data Hot3.

An interface circuit 315 may transmit multi-stream data I/O-requested from the device driver 312 to the storage device 320 through a data channel. In this case, stream data may be randomly transmitted. However, each data transmission unit (e.g., a packet) may have a stream identifier. Accordingly, the storage device 320 may identify data attributes of each of received packets by using the stream identifiers SID.

The storage device 320 includes a storage controller 322 and a nonvolatile memory device 324. The storage controller 322 manages multi-stream data in units of a stream. For example, the storage controller 322 may select and allocate a memory block, in which write data are to be stored, in units of a stream identifier. The storage controller 322 may select the memory block BLK3 for the purpose of storing data of the stream identifier SID_1. Afterwards, in the case of receiving write data of the stream identifier SID_1, the storage controller 322 may intensively program write data of the stream identifier SID_1 to the memory block BLK3. In contrast, the storage controller 322 may select the memory block BLK9 for the purpose of storing data of the stream identifier SID_2. In the case of receiving an input/output (I/O) request for write data of the stream identifier SID_2, the storage controller 322 may intensively program write data of the stream identifier SID_2 to the memory block BLK9. As in the above description, the storage controller 322 may respond to an input/output (I/O) request for data of the stream identifier SID_3.

According to various embodiments, a storage device capable of identifying hot data with high accuracy without overhead and an operating method thereof may be provided.

While various exemplary embodiments have been described above, it will be apparent to those of ordinary skill in the art that various changes and modifications may be made thereto without departing from the spirit and scope of the present disclosure as set forth in the following claims.

What is claimed is:

1. A method comprising:
sampling, by a processor, a plurality of input/output requests from a host to generate sampled input/output requests;
classifying, by the processor, the sampled input/output requests into a plurality of clusters using an unsupervised learning algorithm;
analyzing, for each of the plurality of clusters, statistical information about an LBA range, an LBA continuity count, an overwrite ratio, an input/output count, an input/output interval, and an input/output request;
determining one or more clusters from among the plurality of clusters that have a random characteristic and an overwrite characteristic based on a result of the analyzing;
determining, by the processor, a hot data range based on the one or more clusters; and
incorporating, by the processor, the determined hot data range into a hot data table.

2. The method of claim 1, wherein the sampling comprises storing a logical block address (LBA) or a data size of each of the sampled input/output requests.

3. The method of claim 1, wherein the sampled input/output requests are selected at random times from the plurality of input/output requests from the host.

4. The method of claim 3, wherein the sampling is performed only during a sampling period among periods in which the plurality of input/output requests are transmitted from the host.

5. The method of claim 1, wherein the unsupervised learning algorithm includes at least one of a heuristic algorithm, a K-means algorithm, a density-based spatial clustering of applications with noise (DBSCAN) algorithm, a Gaussian Mixture algorithm, or a Balanced Iterative Reducing and Clustering using Hierarchies (BIRCH) algorithm.

6. The method of claim 1, further comprising:
receiving a first input/output request transmitted from the host;
searching whether a logical block address corresponding to the first input/output request is present in the hot data table; and
selecting a memory block, to which data corresponding to the first input/output request are to be stored, based on a result of the searching.

7. The method of claim 6, wherein the selecting of the memory block is performed by determining a stream identifier to be allocated to the data corresponding to the first input/output request.

8. A storage device comprising:
a storage controller configured to sample, during a first period, a plurality of input/output requests transmitted from a host to generate sampled data, to classify the sampled data into a plurality of clusters using an unsupervised learning algorithm, to analyze, for each of the plurality of clusters, statistical information about an LBA range, an LBA continuity count, an overwrite ratio, an input/output count, an input/output interval, and an input/output request, to determine one or more clusters from among the plurality of clusters that have a random characteristic and an overwrite characteristic based on a result of the analysis, to determine a hot data range based on the one or more clusters, and to incorporate the determined hot data range into a hot data table; and a nonvolatile memory device configured to provide a memory block for storing write-requested data under control of the storage controller, wherein the storage controller determines whether input/output requests transmitted from the host during a second period correspond to hot data, with reference to the hot data table.

9. The storage device of claim 8, wherein the hot data range is a logical block address (LBA) range.

10. The storage device of claim 9, wherein, during the first period, the storage controller samples the plurality of input/output requests at random times to generate the sampled data.

11. The storage device of claim 8, wherein the unsupervised learning algorithm includes at least one of a heuristic algorithm, a K-means algorithm, a density-based spatial clustering of applications with noise (DBSCAN) algorithm, a Gaussian Mixture algorithm, and a Balanced Iterative Reducing and Clustering using Hierarchies (BIRCH) algorithm.

12. The storage device of claim 8, wherein the storage controller receives the plurality of input/output requests in a multi-stream scheme, and wherein the storage controller allocates, based on the hot data table, stream identifiers to the plurality of input/output requests transmitted from the host during the second period.

13. The storage device of claim 8, wherein the storage controller classifies a hot intensity of hot data as one of a plurality of hot intensities and allocates different memory blocks to the plurality of hot intensities, respectively.

14. A memory system comprising:
a storage device configured to receive multi-stream data and to allocate a memory block on a stream basis; and a host configured to sample a plurality of input/output requests from at least one application program during a first period to generate sampled data, to classify the sampled data into a plurality of clusters using an unsupervised learning algorithm, to analyze, for each of the plurality of clusters, statistical information about an LBA range, an LBA continuity count, an overwrite ratio, an input/output count, an input/output interval, and an input/output request, to determine one or more clusters from among the plurality of clusters that have a random characteristic and an overwrite characteristic based on a result of the analysis, to determine a hot data range based on the one or more clusters, to incorporate the determined hot data range into a hot data table, and to allocate, based on the hot data table, a stream identifier to be transmitted to the storage device during a second period.

15. The memory system of claim 14, wherein the host includes a device driver that executes the unsupervised learning algorithm.

16. The storage device of claim 14, wherein the unsupervised learning algorithm includes at least one of a heuristic algorithm, a K-means algorithm, a density-based spatial clustering of applications with noise (DBSCAN) algorithm, a Gaussian Mixture algorithm, and a Balanced Iterative Reducing and Clustering using Hierarchies (BIRCH) algorithm.

17. The storage device of claim 14, wherein the host randomly samples the plurality of input/output requests during the first period to generate the sampled data.

* * * * *